(12) United States Patent
Pekcan

(10) Patent No.: US 10,218,137 B2
(45) Date of Patent: Feb. 26, 2019

(54) USB CAR CHARGER WITH INTEGRATED VEHICLE ALARM

(71) Applicant: Technaxx Deutschland GmbH & Co. KG, Frankfurt (DE)

(72) Inventor: Pascal Pekcan, Frankfurt (DE)

(73) Assignee: Technaxx Deutschland GmbH & Co. KG, Frankfurt (DE)

( * ) Notice: Subject to any disclaimer, the term of this patent is extended or adjusted under 35 U.S.C. 154(b) by 0 days.

(21) Appl. No.: 15/878,499

(22) Filed: Jan. 24, 2018

(65) Prior Publication Data

US 2018/0366892 A1 Dec. 20, 2018

(30) Foreign Application Priority Data

Jun. 20, 2017 (DE) .................... 20 2017 103 663 U
Jan. 3, 2018 (EP) ..................................... 18150140

(51) Int. Cl.
| | |
|---|---|
| *H01R 31/06* | (2006.01) |
| *H01R 24/62* | (2011.01) |
| *H01R 13/66* | (2006.01) |
| *H01R 13/518* | (2006.01) |
| *H02J 7/00* | (2006.01) |
| *B60R 25/10* | (2013.01) |
| *B60R 25/24* | (2013.01) |
| *H01R 107/00* | (2006.01) |

(52) U.S. Cl.
CPC ......... *H01R 31/06* (2013.01); *B60R 25/1003* (2013.01); *B60R 25/1004* (2013.01); *B60R 25/24* (2013.01); *H01R 13/518* (2013.01); *H01R 13/6683* (2013.01); *H01R 24/62* (2013.01); *H02J 7/0045* (2013.01); *H02J 7/0047* (2013.01); *H01R 2107/00* (2013.01)

(58) Field of Classification Search
CPC .......... B60C 23/0494; B60C 2019/004; B60C 23/20; B60C 19/00; B60C 23/00; B60C 23/0447; B60C 23/0493; B60C 23/0479; B60C 23/0498; B60C 23/0452; B60C 23/0483; B60C 23/0488; B60C 23/045; B60C 23/0461
USPC ... 340/429, 426.22, 426.1, 427–428, 426.11, 340/426.2, 426.26, 438, 539.1, 541, 566, 340/568.1, 571, 578, 5.61
See application file for complete search history.

(56) References Cited

U.S. PATENT DOCUMENTS

| | | | |
|---|---|---|---|
| 9,741,224 B1* | 8/2017 | Singh | H04W 4/14 |
| 2013/0242470 A1* | 9/2013 | Lo | B60Q 7/00 |
| | | | 361/679.01 |
| 2015/0002282 A1* | 1/2015 | Schnidrig | B60R 25/104 |
| | | | 340/426.22 |
| 2016/0173746 A1* | 6/2016 | Chien | F21V 33/0052 |
| | | | 348/159 |

(Continued)

FOREIGN PATENT DOCUMENTS

| | | |
|---|---|---|
| EP | 1950108 B1 | 1/2012 |
| JP | 2003182525 A | 7/2003 |
| JP | 2006199254 A | 8/2006 |

*Primary Examiner* — Daniel Previl
(74) *Attorney, Agent, or Firm* — Smartpat PLC

(57) ABSTRACT

A USB charger includes a connector for plugging into a cigarette lighter socket of a motor vehicle. The USB charged provides one or more USB sockets and includes an integrated alarm unit for protection against intruders in the motor vehicle. The alarm unit includes a motion sensor and an acoustic alarm signal generator.

4 Claims, 2 Drawing Sheets

(56) References Cited

U.S. PATENT DOCUMENTS

| | | | |
|---|---|---|---|
| 2017/0039843 A1* | 2/2017 | Paulson | G08B 29/185 |
| 2017/0101006 A1* | 4/2017 | DeVries | B60R 25/00 |
| 2017/0117737 A1* | 4/2017 | Chien | H02J 7/022 |
| 2018/0023828 A1* | 1/2018 | Lutz | F24F 11/30 |
| | | | 700/276 |
| 2018/0072114 A1* | 3/2018 | Lesesky | B60C 23/0483 |

* cited by examiner

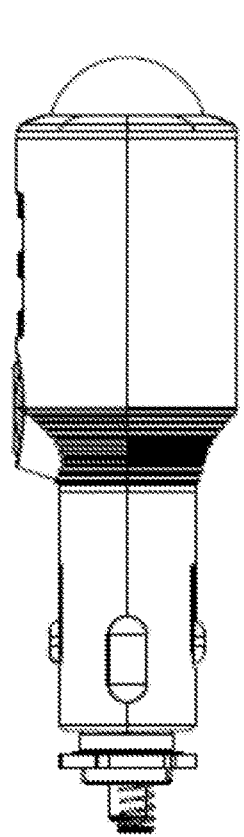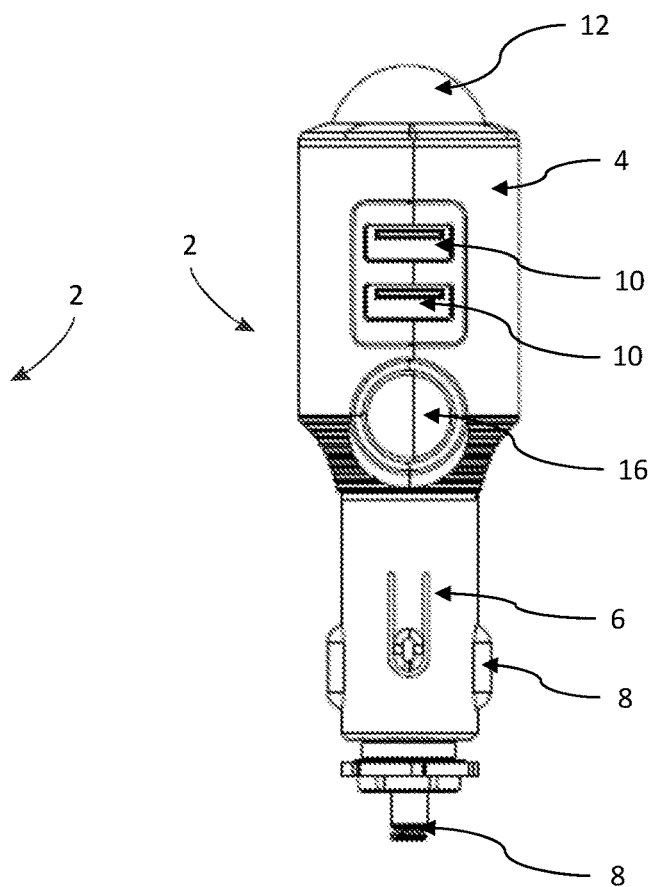
FIG. 1    FIG. 2
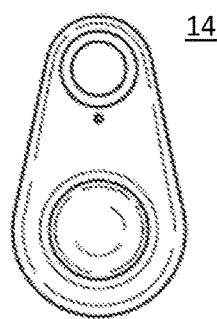
FIG. 3

USB CAR CHARGER WITH INTEGRATED VEHICLE ALARM

TECHNICAL FIELD

The present invention relates to a USB car charger with an integrated vehicle alarm security system.

BACKGROUND

USB chargers are generally known. Also known are connection adapter for connecting electrical consumers to the cigarette lighter of a motor vehicle.

SUMMARY

An object of the present disclosure is to provide an optimized USB charger for use in a motor vehicle and to provide useful additional functions.

The object is achieved by a USB charger with the features as in claim 1.

The USB charger has a port for plugging into a cigarette lighter socket of a motor vehicle and one or more USB sockets for charging electronic devices such as cell phones and the like. An integrated security alarm unit is provided to protect the motor vehicle against intruders. The security alarm unit comprises a motion sensor and an acoustic alarm signal generator. This unexpectedly combines different functions that work synergistically within one and the same device.

Advantageous embodiments are the subject of the dependent claims and the following detailed description of an exemplary embodiment.

BRIEF DESCRIPTION OF THE DRAWINGS

FIG. 1 is a front view of an exemplary USB car charger with an integrated vehicle alarm security system.

FIG. 2 is a side view of the device as in FIG. 1.

FIG. 3 shows a plan view of a remote control which may be used in combination with the device as in FIG. 1.

DETAILED DESCRIPTION

Figure 4:
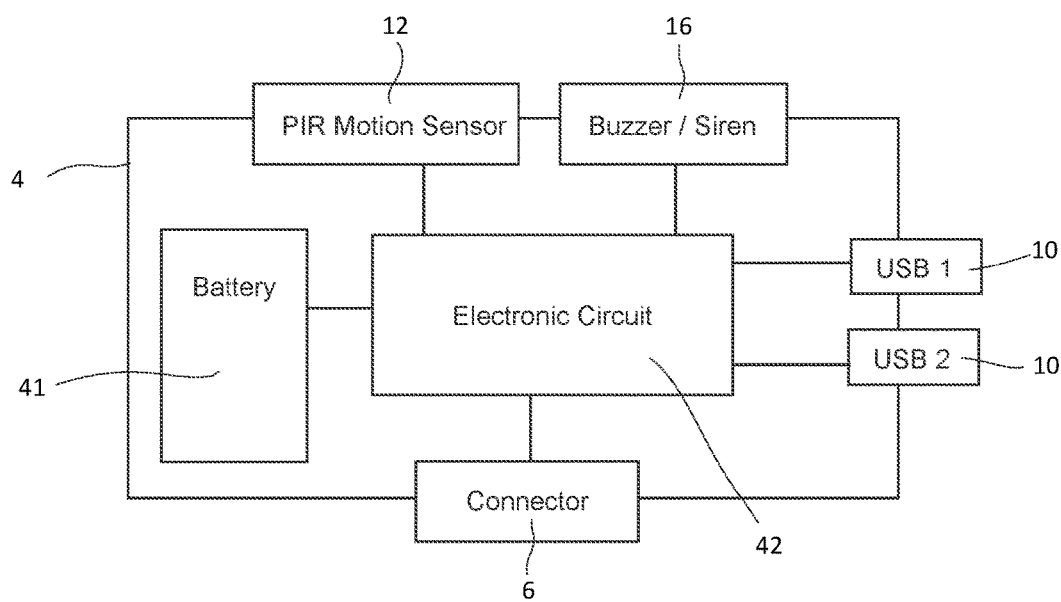
FIG. 4 is a schematic block diagram of the device as in FIG. 1.

Referring to FIG. 1, FIG. 2, and FIG. 4, a USB charger 2 is configured to be connected to a socket of a cigarette lighter in a motor vehicle. For insertion into the cigarette lighter socket a lower end of USB charger's housing 4 is a correspondingly shaped plug or terminal connector 6 with associated electrical contacts 8. Through the electrical contacts 8 of the terminal connector 6 an electronic circuit 42 which is integrated into the housing 4 is supplied with battery voltage of the motor vehicle, usually 12 to 24 V DC. The electronic circuit conditions the vehicle's battery voltage to provide a lower regulated output voltage of, for example, 5 V as required according to the USB specification. In an upper part of the housing 4, there are a one or more USB connection sockets 10 arranged in a recess. As shown in FIG. 2, there may for example be two USB connection sockets 10. The USB connection sockets 10 are supplied via the electronic circuit 42 with the necessary regulated output voltage. Various electronic devices configured to be charged through a USB connection can be connected to and charged through the USB connection sockets 10. To protect such external devices, the electronic circuit 42 has a short-circuit detector and an overload protection, which limits the current output to a maximum value of, for example, 2.6 A.

It is desirable, that the USB charger 2 stays operational and attached devices keep charging, even if the vehicle's ignition is turned off or the charger is disconnected from the cigarette lighter socket. This is accomplished by including a rechargeable battery 41 which is integrated into the housing 4. The rechargeable battery 41 may be a lithium-ion battery or lithium-polymer battery with a capacity of, for example, 300 mAh. The rechargeable battery 41 is connected to the electronic circuit 42 in such a way that the functionality of a so-called power bank is realized. That is, the rechargeable battery 41 is charged at vehicle terminal battery voltage applied to the terminal connector 6 and later feeds the USB terminal sockets 10 (and thus the connected loads) when the automotive battery voltage is not available.

The USB charger 2 further includes an integrated alarm unit. For this purpose, a motion detector or motion sensor 12 is provided at an upper end of the housing 4. The housing 4 may be elongated, and be generally rod- or club-shaped. The motion detector or motion sensor 12 may be a PIR-type sensor which is integrated into the housing 4. A PIR (Pyroelectric Infrared Sensor or Passive Infrared Sensor) sensor is a semiconductor sensor for detecting temperature changes. PIR sensors are based on pyroelectric properties of certain semiconductor crystals—materials which generate energy when exposed to heat. That is, temperature change leads to a measurable change in the electrical voltage. In the context of the present disclosure, such a PIR sensor is used to detect the heat radiation emitted by an intruder into the motor vehicle and to trigger an alarm. For this purpose, integrated into the housing 4 is an acoustic alarm signal generator 16, such as a loud horn or a siren. As shown in FIG. 2, the acoustic alarm signal transmitter 16 may be an electrical buzzer or siren, which is advantageously inserted in a lateral recess in the housing 4. The acoustic alarm signal transmitter 16 may be arranged below and face in the same direction as the USB connection sockets 10. The buzzer or siren may be an audio magnetic or audio piezo transducer. The acoustic alarm signal generator 16 may include a membrane, in particular a metal diaphragm, which is electromagnetically or piezoelectrically excitable and caused to resonate. Instead of a membrane, any other sound body for sound production may be used. The acoustic alarm signal generator 16 causes a loud and piercing sound to scare away an intruder.

In an exemplary embodiment, the PIR sensor covers a conical spatial area (detection area) with an opening angle of, for example, 120° and a range of 3 to 4 meters. This detection area is matched to the interior dimensions of conventional motor vehicles.

Power to the alarm unit is supplied by the power bank mentioned above. The power bank may be configured such that with a fully charged rechargeable battery 41 and in the absence of other consumers being connected to the USB ports 10 a standby time of, for example, 10 days is realized when the ignition of the vehicle is turned off.

The arming and disarming of the alarm unit by an authorized user is affected via an associated wireless remote control 14 as shown in FIG. 3. An already triggered alarm tone can only be switched off by use of the remote control 14. Even if an intruder pulls the USB charger 2 with the integrated alarm unit from the cigarette lighter, the alarm sound will continue for at least a preset time of, for example, a few minutes. Subsequently, an automatic shutdown can be provided to protect the environment.

In summary, a user can conveniently plug the USB charger 2 into the cigarette lighter socket of a motor vehicle to automatically recharge an integrated power bank with USB ports while driving. The USB charger 2 additionally provides an integrated vehicle security alarm system with motion sensor which can be armed and disarmed by use of an associated remote control 14. If an intruder is detected by the motion sensor 12 while the alarm system is active, a piercingly loud acoustic alarm is triggered which can only be disabled by use of the remote control 14. The device is compact and portable, having dimensions of e.g. 32 mm×34 mm×95 mm. By consciously dispensing with complicated additional functions, the device is very easy to use.

What is claimed is:

1. A USB charger with integrated vehicle alarm, comprising:
   a housing;
   an electronic circuit for providing a regulated output voltage arranged within the housing;
   a connector for plugging the USB charger into a cigarette lighter socket of a motor vehicle formed at a lower end of the housing and operatively connected to the electronic circuit;
   one or more USB connector sockets operatively connected to the electronic circuit and accessible through the housing; and
   an integrated alarm unit arranged within the housing for protection against intruders in the motor vehicle, comprising
   a motion sensor and
   an acoustic alarm signal generator,
   wherein the integrated alarm unit can be armed and disarmed via an associated wireless remote control, and
   wherein after an alarm has been triggered the alarm system produces a loud sound for at least a predetermined period of time which can only be switched off prior to expiration of the predetermined period of time by use of the wireless remote control.

2. The USB charger as in claim 1,
   further comprising an integrated rechargeable battery,
   wherein the integrated rechargeable battery is charged via the cigarette lighter socket when power is applied to the connector from a motor vehicle electrical system and
   wherein the integrated rechargeable battery supplies power to the one or more USB connection sockets and to the integrated alarm unit when power is not being applied to the connector.

3. The USB charger as in claim 1, wherein the motion sensor is a PIR sensor.

4. The USB charger as in claim 1,
   wherein the one or more USB connector sockets are arranged between the motion sensor and the acoustic alarm signal generator and
   wherein the one or more USB connector sockets and the acoustic alarm signal generator face the same direction.

* * * * *